March 7, 1967  J. M. EUBANKS  3,308,367
TWO-PHASE SQUARE WAVE GENERATOR
Filed Feb. 18, 1964  2 Sheets-Sheet 1

INVENTOR
J. M. EUBANKS
BY Walter M. Thiel
ATTORNEY

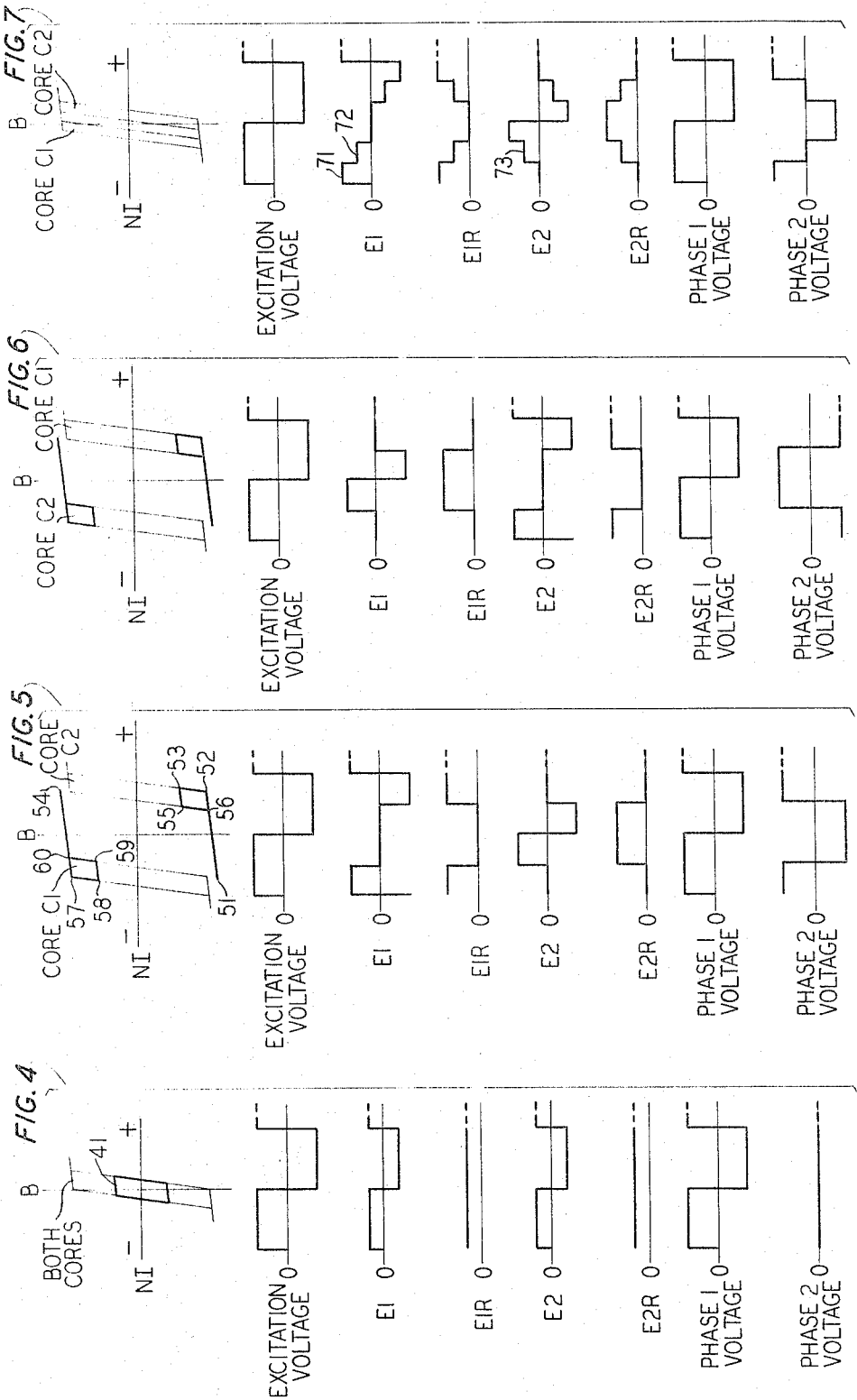

United States Patent Office 3,308,367
Patented Mar. 7, 1967

3,308,367
TWO-PHASE SQUARE WAVE GENERATOR
John M. Eubanks, Greensboro, N.C., assignor to Bell Telephone Laboratories, Incorporated, New York, N.Y., a corporation of New York
Filed Feb. 18, 1964, Ser. No. 345,732
8 Claims. (Cl. 321—3)

This invention relates to waveform generators and more particularly to a generator for developing a two-phase output having one phase controlled in magnitude and phase sequence.

The invention finds special utility in the control of two-phase servomotors, although it is not limited to such use. The phase splitting circuits commonly used in servomotor controls are usually frequency and load sensitive. The present invention is neither sensitive to load nor to frequency so that the phase angle of ninety degrees between the two phases is rigorously maintained. The transfer from leading to lagging phase sequence is easily obtained under control of the polarity of a direct current while the magnitude of one of the phase voltages is controlled by the strength of the direct current.

The two-phase generator of this invention comprises a pair of saturable magnetic cores that are oppositely biased by a direct current which is variable as to magnitude and polarity. The cores are driven from a square wave source to generate square voltage waves in windings wound thereon. A winding on one core is connected in series with a winding on the other core to provide one of the two phase voltages. The square wave voltage generated in another winding on each core is rectified by a full-wave rectifier and the two rectified outputs are connected series opposing to provide the second phase voltage. This latter voltage is varied in magnitude and in phase by the magnitude and polarity of the direct current bias.

Figure 1:
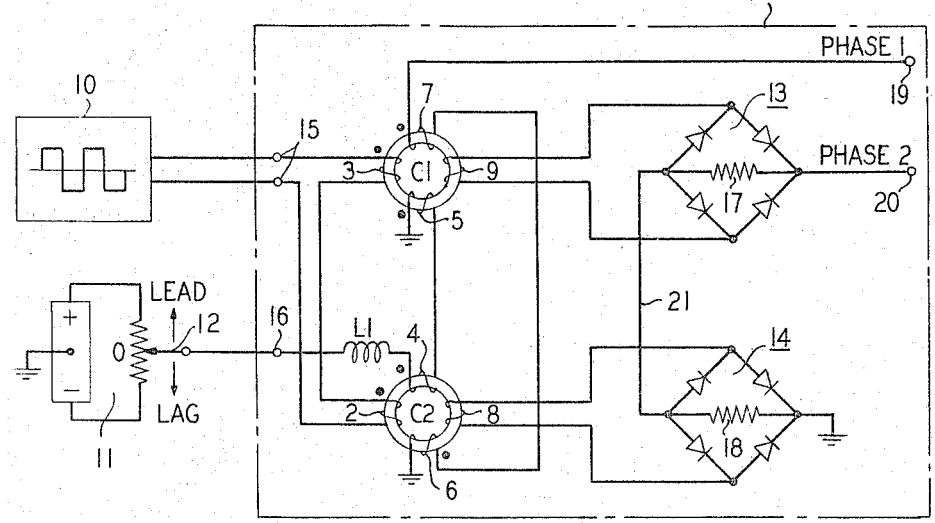
Figure 2:
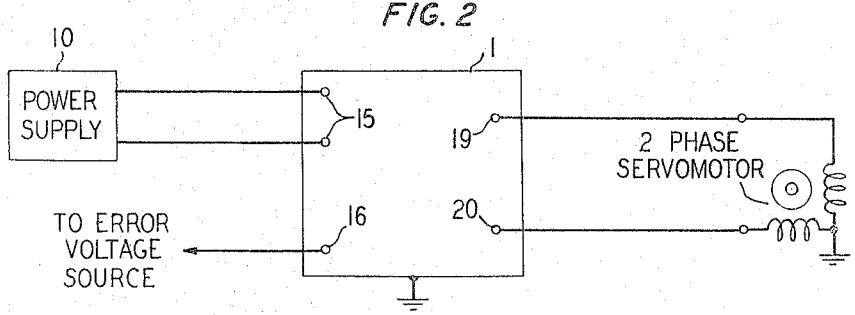
Figure 3:
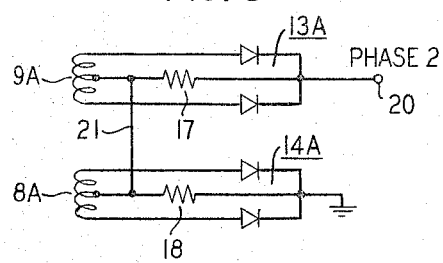

The invention may be better understood by reference to the accompanying drawings, in which:

FIG. 1 discloses an embodiment of the invention from which the two square wave voltages may be derived;

FIG. 2 is a block diagram illustrating how this invention may be employed to control a conventional two-phase servomotor;

FIG. 3 discloses an alternative rectifier arrangement for the embodiment shown in FIG. 1; and FIGS. 4 through 7 disclose hysteresis loops and associated waveforms to aid in explaining the operation of the invention.

The embodiment of the invention in FIG. 1 shows the invention included within the dotted rectangle 1 to comprise saturable magnetic cores C1 and C2 of two transformers, each containing four windings. Windings 2 and 3 are the exciting windings and for this purpose they preferably have an equal number of turns and are connected in series to an external source 10 of square wave energy through a pair of terminals 15. Windings 4 and 5 also preferably have equal turns and are the control windings. These windings are also connected in series but in opposite sense, as indicated by their dots, and to a source of control voltage through an inductor L1 and terminal 16. Inductor L1 isolates the alternating voltages, generated in the transformer windings, from the control circuit. A control voltage source 11 of conventional configuration is disclosed having a potentiometer with brush 12 arranged to provide a variable direct voltage of either polarity with respect to ground. By reason of the fact that windings 4 and 5 are connected in series and in opposite sense, the two cores C1 and C2 will be oppositely biased by the control current, the polarity and degree of bias being determined by the position of brush 12. Windings 6 and 7, also of equal turns, comprise one pair of output windings which are connected series aiding as indicated by their associated dots. These windings provide one of the phase voltages of the two-phase output, this voltage identified as phase 1 and appearing at output terminal 19. This voltage is with respect to ground since a terminal of winding 6 is grounded. Output windings 8 and 9, also having equal turns, are each connected to a full-wave rectifier so that the voltages generated therein are rectified with their rectified outputs connected in opposed polarity to subtract one from the other. Output winding 9 on core C1 is connected to the input terminals of a conventional full-wave bridge rectifier 13 while output winding 8 is connected to the input terminals of an identical full-wave rectifier 14. A resistor 17 is connected across the output terminals of bridge 13 and an identical resistor 18 is connected across the output terminals of rectifier 14. Resistors 17 and 18 are connected in series by way of conductor 21 and the positive end of resistor 18 is connected to ground while the positive end of resistor 17 is connected to the output terminal 20 of the second phase, here identified as phase 2. The manner by which this second phase voltage is constructed from the difference between the rectified outputs of windings 8 and 9 will be more fully described in connection with FIGS. 4 through 7.

In explaining the operation of the invention, it must be kept in mind that the cores C1 and C2 of the two transformers are of the saturable type so that they have nearly rectangular hysteresis loops of small area. As is well known when such transformers are excited from a square wave square, a square wave voltage will be induced in all of their windings. Consequently, when exciting windings 2 and 3 are excited from square wave source 10, output windings 6 and 7 will have induced therein identical square wave voltages in phase with each other and since windings 6 and 7 are connected series aiding, these two square wave voltages are added to provide the phase 1 voltage at terminal 19. This voltage is maintained in a fixed phase relation with reference to the exciting voltage and is of the same frequency as the exciting voltage. The construction of the phase 2 voltage from the rectified outputs of windings 8 and 9 and the fact that this voltage varies in magnitude and phase sequence in accordance with the magnitude and polarity of the control direct voltage applied to terminal 16 is not so obvious but may be explained with reference to FIGS. 4 through 7.

Referring first to FIG. 4, the hysteresis loops of the two cores are shown superimposed because of the absence of a bias voltage at terminal 16. In this illustration, the hysteresis loop has been exaggerated considerably in that the area is actually considerably smaller than that depicted and the saturation portions at the top and bottom are actually more nearly horizontal than here shown. However, it is believed that the exaggeration is justified in order to more easily explain the invention. The magnetizing force in ampere terms, NI, is shown positive to the right and negative to the left and the resulting induction B is assumed positive up and negative down. The excitation voltage supplied to windings 2 and 3 is shown by the first waveform directly under the hysteresis loop. The alternating voltage developed in each of the windings 7 and 9 of core C1 is shown directly under the excitation voltage and is designated E1. Full-wave rectifier 13 develops the characteristic shown as E1R, which is merely a full wave rectification of the voltage wave E1 shown directly above it. Similarly, the waveform E2 is generated in the output windings 6 and 8 of core C2 and the rectified output of rectifier 14 is illustrated by the characteristic E2R. The Phase 1 voltage is obtained by simply adding the waveform E1 to the waveform E2 which is physically obtained from the embodiment shown in FIG. 1 by connecting windings 6 and 7 in series aiding. It is of the same form and of the same frequency as the exciting voltage. The Phase 2 voltage is zero since the rectifiers 13 and 14 are connected in series opposing relation thereby producing an output at terminal 20 which is the difference between the rectified outputs of rectifiers 13 and 14, that is, the difference between the characteristic E1R and the characteristic E2R shown in FIG. 4. It must be remembered that these characteristics in FIG. 4 are those which are obtained when the bias current in windings 4 and 5 is zero. Under these circumstances, the two phase voltages are as shown by their characteristics in FIG. 4.

In FIG. 5 it is assumed that potentiometer slider 12 has been moved upwardly so as to cause a current to flow through the bias windings 4 and 5 to positively bias core C1 and negatively bias core C2, thereby displacing their hysteresis loops as indicated in FIG. 5. Once again, this degree of bias has been shown exaggerated for descriptive reasons. When used with a servo system, as will be explained later, these loops are only slightly displaced before corrective action brings them back into the zero bias condition illustrated in FIG. 4. When the excitation voltage goes into its positive phase, it is assumed that the magnetizing force is going in a positive direction. Assuming for the moment that, at the instant the exciting voltage swings from negative to positive, the magnetizing force is negative at a position corresponding with point 51 on the negative saturation loop of core C2. This corresponds also with point 58 on core C1. Under these conditions, the cores are both effectively saturated so that the current rapidly increases to drive core C1 from point 58 of its hysteresis loop to point 59. However, at point 59 core C1 comes out of effective saturation and its induction changes as indicated between points 59 and 60, thereby generating a positive-going square topped voltage in windings 7 and 9 as shown by its voltage characteristic E1 in FIG. 5. However, when point 60 is reached, core C1 becomes saturated and since at this magnetizing force both cores are now saturated, the magnetizing current very rapidly increases until point 52 on the hysteresis loop of core C2 is reached. At this point, core C2 comes out of saturation so that its induction changes as indicated between points 52 and 53 of its hysteresis loop. It should be kept in mind that the low inductance of the two saturated cores causes the magnetizing force to change almost instantly between the point 60 of core C1 and of point 52 of core C2. The change of induction between points 52 and 53 in core C2 generates in its windings 6 and 8 a positive going voltage as indicated by the characteristic E2 of FIG. 5. This continues until point 53 is reached and during this period a substantially constant voltage is generated, as is indicated by the square top in characteristic E2. At this instant, the excitation voltage reverses in polarity thereby causing the magnetizing force to change very abruptly from point 53 to point 55 of the hysteresis loop of core C2. Here core C2 again moves out of saturation to develop a negative voltage as the magnetizing force changes the induction of core C2 between points 55 and 56 of its hysteresis loop. When point 56 is reached, both cores are again in their saturation states so that the current increases in the negative direction almost instantaneously until the magnetizing force reaches a point corresponding to point 57 on core C1 at which point core C1 comes out of saturation to develop a negative going voltage in windings 7 and 9 as shown by the characteristic E1 in FIG. 5. From the above description, it will be clear that whenever both cores are saturated, the time rate of current change in the exciting windings is very large but when at least one core is unsaturated, the rate of current change abruptly lowers as it does in any circuit containing inductance. By driving the cores through only minor hysteresis loops in the manner subsequently to be described, the exciting circuit is self current limiting.

The voltage characteristics E1R and E2R of FIG. 5 are the full-wave rectified outputs from the two rectifiers 13 and 14, respectively. It will be noted that these merely represent the rectification of voltage waves E1 and E2, respectively, of FIG. 5. As in the case of FIG. 4, the Phase 1 voltage wave is of the same form as the excitation voltage and of the same frequency. The Phase 2 voltage waveform is obtained by subtracting the rectified output E2R from the rectified output E1R and is a voltage of the same waveform and frequency as that for Phase 1 but leads Phase 1 by exactly ninety degrees. Thus, both voltages, differing by ninety degrees, are constructed from the square wave outputs from the two cores.

FIG. 6 is identical to FIG. 5 except that the bias current has been reversed in windings 4 and 5 so as to bias both cores in a sense opposite from that disclosed in FIG. 5. In this case, core C1 is negatively biased and core C2 is positively biased by equal amounts. The description of the construction of the waveforms in FIG. 5 also applies to those shown in FIG. 6. The effect of reversing the bias on the two cores is to cause the Phase 2 voltage to lag the Phase 1 voltage, instead of to lead it but the phase difference is still exactly ninety degrees.

It will be noted that only a portion of each hysteresis loop in FIGS. 4, 5 and 6 has been utilized in that the excitation is such as to drive the cores through only minor loops. The minor loop is designated by the reference numeral 41 in FIG. 4. The advantage of minor loop operation is that the power requirement is very much less than it is for major loop operation where both cores become saturated and large currents will flow for an appreciable portion of each cycle. The size of the minor loop is determined by the exciting frequency and the driving amplitude, the area of the loop increasing as the frequency lowers and as the driving amplitude increases. In a practical design, the excitation is designed to give minor loop operation for the worst case condition of the maximum voltage and the minimum frequency which is expected to be encountered. Notwithstanding the fact that the size of the minor loop will change with frequency, there is no shift from the fixed ninety degree relationship between the two phase voltages. This is a distinct advantage of this invention.

In FIG. 7 the two hysteresis loops are shown superimposed and slightly displaced by reason of a small amount of bias current in windings 4 and 5. The bias current is such as to negatively bias core C2 and positively bias core C1. The minor loops have not been shown in this figure to avoid confusion. However, the operation is essentially the same as that previously described for FIG. 5 with a single exception. In the case of FIG. 5, one of the cores is always saturated. However, in FIG. 7 there are instants where both cores are out of saturation, thereby producing the peculiar stepped voltage waveform shown for the generated voltages E1 and E2, respectively. When the excitation voltage switches to its positive direction, core C1 is momentarily driven out of saturation, thereby causing the generation of the first step voltage 71 in voltage E1. A short time later the second core is driven out of saturation so that now both cores are unsaturated to approximately double the inductance in the exciting circuit and reduce the rate of change of the excitation current, thereby resulting in a lower voltage being induced in the windings on core C1. This is represented by the voltage step 72 in waveform E1. Core C2 simultaneously generates the voltage represented by step 73 in waveform E2. As before, the waveform E1R results from the rectification of voltage wave E1 and E2R results from the rectification of voltage wave E2. The Phase 1 voltage waveform of FIG. 7 is obtained by simply adding the waveforms E1 and E2, physically realized by the series connection of windings 6 and 7 in FIG. 1. By comparing FIGS. 4 through 7, it will be noted that the Phase 1 voltage characteristic remains unchanged regardless of the bias applied to the two cores. The Phase 2 voltage is obtained by subtracting the rectified output E2R from E1R, thereby developing a waveform which leads the Phase 1 voltage by exactly ninety degrees. If the biases on the two cores are reversed by reason of reversing the current in windings 4 and 5, the Phase 2 voltage will reverse its phase relation so as to lag the Phase 1 voltage by exactly ninety degrees. The amplitude of the Phase 2 voltage will depend upon the magnitude of the bias current supplied to windings 4 and 5, the limiting condition being that observed in FIG. 4 where the bias current becomes zero to produce a zero Phase 2 voltage. It will thus be apparent that this invention generates the waveforms of the two phases in strict quadrature relationship, the phase sequence being determined by the polarity of the bias current and the magnitude of the Phase 2 voltage being determined by the magnitude of the bias current. This is precisely the desired characteristic for servomotor control.

In FIG. 2 the invention is shown embodied in the rectangle 1 and the terminals shown thereon correspond to those shown in FIG. 1. Power supply 10 may be any convenient square wave source of suitable voltage and frequency. It may be assumed that terminal 16 is connected to the error voltage source of any conventional servo system which is to be mechanically driven by the two-phase motor shown in FIG. 2. A typical old and well known servo system may be found on page 41 of Basic Servo Mechanisms by Ed Bukstein (1963) Holt, Reinhart and Winston, Inc. This invention is introduced in place of the amplifier so that the error voltage, when applied to terminal 16, will cause the development of the Phase 2 voltage between ground and terminal 20 to reversibly drive the two-phase servomotor.

FIG. 3 shows an alternative form of full-wave rectifier network which may replace networks 13 and 14 of FIG. 1. The output windings 8 and 9 on the two cores are replaced by center-tapped windings 8A and 9A, respectively, as schematically indicated in FIG. 3. These center-tapped windings, each with two rectifiers poled as indicated, comprise full-wave rectifier bridges 13A and 14A. As before, the positive end of bridge 13A is connected to output terminal 20 while the positive end of rectifier 14A is connected to ground. Output resistors 17 and 18 are serially connected by means of conductor 21. As this bridge configuration will be recognized as quite conventional, its operation is obvious in view of the explanation previously given with reference to the bridges in FIG. 1.

While this invention has been described in connection with its use as a servomotor control circuit, its utility is by no means limited thereto. In fact, the manual control circuit 11 shown in FIG. 1 may be used to manually control the phase and magnitude of the Phase 2 voltage for any purpose for which such voltages may be needed. Moreover, it is quite obvious that windings 6 and 7 may be similarly connected to rectifier bridge networks so that the Phase 1 voltage is simultaneously varied in amplitude and phase along with the Phase 2 voltage. In this way, the magnitudes of both of the phase voltages are simultaneously varied but, since both phase voltages are reversed, the net phase sequence will remain unchanged. In this case, a two-phase motor could be caused to vary its speed with the magnitude of the control voltage but will not reverse when the polarity of the control voltage reverse. Thus, both types of operation are possible by this obvious modification of the invention. Also, several generators in accordance with this invention may be connected to the same excitation source without any disturbing interactions but the desired phase relations of all output voltages will be rigorously maintained. Other modifications may be made by those skilled in this art without departing from the scope of the invention.

What is claimed is:

1. A two-phase square wave generator having one of its phase voltages controlled in magnitude and in phase sequence, said generator comprising a pair of saturable magnetic cores, each having a substantially rectangular magnetic hysteresis characteristic, an exciting winding on each core and circuit means connecting them in series for connection to an external single-phase square-wave voltage source, a first output winding on each core and circuit means connecting them series aiding to provide the first of the two phase voltages, a second output winding on each core, a fullwave rectifier connected to each of said second output windings to rectify the voltage wave generated therein, a circuit means connecting said rectifiers series opposing so that their rectified outputs will provide the second phase voltage, and a direct current bias circuit including an additional winding on each core to oppositely bias said cores.

2. The combination of claim 1 and a means connected to said direct current bias circuit for varying the magnitude and polarity of the current in said direct current bias circuit to control the magnitude and phase sequence of the second phase voltage.

3. The combination of claim 1 wherein said first output windings have an equal number of turns and the number of turns in each of said second output windings is equal.

4. A two-phase square-wave generator having one of its phase voltages controlled in magnitude and in phase sequence, said generator comprising two saturable magnetic cores, each having a substantially rectangular magnetic hysteresis characteristic, a plurality of windings on each core, means connecting a winding on each core in series for connection to an external single-phase square-wave voltage source, a second means connecting another winding of each core series aiding to provide the first of the two phase voltages, a full-wave rectifier for each core and connected to other windings thereon to derive a full-wave rectified output from each core, a circuit means connecting the rectified outputs from said rectifiers series opposing to provide the second of the two phase voltages, and a direct current bias circuit including an additional winding on each core to oppositely bias said cores.

5. The combination of claim 4 wherein the two windings connected series aiding to provide the first phase voltage have an equal number of turns and the two windings connected to said rectifiers have an equal number of turns.

6. The combination of claim 4 and an inductor connected in series with said bias circuit.

7. A two-phase motor control circuit having one of the phase voltages controlled in magnitude and in phase sequence, said control circuit comprising two saturable magnetic cores, each having a substantially rectangular magnetic hysteresis characteristic, a plurality of windings on each core, means connecting a winding of each core in a series circuit, a square-wave voltage source connected to said series circuit to supply power thereto, a second means connecting another winding of each core series aiding to provide the first of the two phase voltages, a full-wave rectifier for each core and connected to other windings thereof to derive a full-wave rectified output from each core, a circuit means connecting the rectified outputs from said rectifiers series opposing to provide the second of the two phase voltages, and a direct current bias circuit including an additional winding of each core to oppositely bias said cores.

8. The combination of claim 7 and a means connected to said direct current bias circuit for varying the magnitude and polarity of the current in said direct current bias circuit to control the magnitude and phase sequence of the second phase voltage.

References Cited by the Examiner

UNITED STATES PATENTS 2,811,683 10/1957 Spencer _____ 318—207.55
3,083,327 3/1963 Byloff _____ 318—207.55

References Cited by the Applicant

A.I.E.E. Transactions, Part I, Communications and Electronics, Decicycle Magnetic Amplifier Systems for Servo Applications, page 667 (670), November 1955.

JOHN F. COUCH, *Primary Examiner.*

W. H. BEHA, *Assistant Examiner.*